United States Patent Office 3,350,314
Patented Oct. 31, 1967

3,350,314
FOAMABLE DE-ICING/DEFROSTING COMPOSITION AND METHOD OF DE-ICING AND DEFROSTING
Sydney Dawtrey, Epsom, Surrey, and Harold C. King, Englefield Green, Surrey, England, assignors to Shell Oil Company, New York, N.Y., a corporation of Delaware
No Drawing. Filed Sept. 15, 1964, Ser. No. 396,702
Claims priority, application Great Britain, Sept. 24, 1963, 37,518/63; July 22, 1964, 29,583/64
5 Claims. (Cl. 252—70)

This invention relates to foamable compositions for deicing/defrosting surfaces, for example external surfaces of aircraft on the ground.

According to the present invention, a foamable composition for deicing/defrosting surfaces comprises an alkylene polyol; a tertiary amine that is soluble in the composition and in which one group attached to the nitrogen atom is a $C_{12-18}$ aliphatic hydrocarbyl group and the other groups attached to the nitrogen atom are polyoxyalkylene groups; and water.

If desired, the composition can comprise a $C_{1-3}$ monohydric aliphatic alcohol, for example ethyl alcohol. The alcohol may facilitate dispensing of the composition, for example when it is to be applied as a foam in cold weather to an aircraft in the open on the ground. A convenient range of concentrations for the alcohol is 1 to 10 (for example 3 to 5) percent by weight of the composition.

The alkylene polyol can be present either as a single alkylene polyol or as a mixture of alkylene polyols, for example a mixture of a diol and a triol. The amount of alkylene polyol present in the composition will depend on the foaming and deicing/defrosting properties required of the composition. Examples of the alkylene polyol are ethylene glycol, propylene glycol, butylene glycol, hexylene glycol, and glycerol.

The substituted tertiary amine for the purpose of the invention can be present as about 0.5 to 5 (for example 0.5 to 3) percent by weight of the composition. Examples of the $C_{12-18}$ aliphatic hydrocarbyl group in the amine are aliphatic hydrocarbyl groups obtained from fatty sources, for example coco amine, tallow amine, soybean amine, stearyl amine, dehydroabietyl amine, dihydroabietyl amine or tetrohydroabietyl amine. The polyoxyalkylene groups attached to the nitrogen atom can each have 2 to 30 oxyalkylene units. The oxyalkylene units can be oxyethylene or oxypropylene units or mixtures of them in the form of block polymers or copolymers. Examples of the amines are those amines sold by Armour Chemical Company as "Ethomeens."

The amount of water present in the composition will depend on the foaming and deicing/defrosting properties required of the composition. For, although more foam can be produced by increasing the amount of water, an increase in the amount of water will give a decrease in the deicing/defrosting properties of the foam.

The composition can comprise various minor additives chosen from, for example, dyes, wetting agents and anti-corrosion agents. An example of an anti-corrosion agent is dipotassium hydrogen phosphate. An example of a wetting agent is an octyl formol/ethylene oxide condensate, for example one having an average of about 7.5 oxyethylene units. Octyl formol is an octyl phenol formaldehyde condensate having a molecular weight of about 1100, and its preparation is discussed in U.S. Patent No. 2,410,652.

In using a foamable deicing/defrosting composition of the invention, the composition is foamed and then applied to a surface to be deiced/defrosted. The foaming can be produced by a Sunbeam spray lance sold by Sunbeam Anticorrosives Limited, West Molesey, Surrey, England, and described in the Lorant and Webster U.S. patent application No. 218,478 filed on August 13, 1962.

The following examples will now be given to illustrate the invention.

EXAMPLE I

A foamable deicing/defrosting composition was made by blending together the following components in the proportions indicated.

| Components | Percent by weight of composition |
|---|---|
| Ethylene glycol | 68 |
| Ethomeen S25 (namely a tertiary amine of the formula $R-N\begin{matrix}(CH_2CH_2O)_{7.5}-H\\(CH_2CHO)_{7.5}-H\end{matrix}$ in which R is a fatty alkyl group obtained from soybean amine) | 1 |
| Water | 25 |
| Ethyl alcohol | 4 |
| Dipotassium hydrogen phosphate | 1 |
| Octyl formol/ethylene oxide condensates having 7.5 oxyethylene units per octyl group | 1 |
| | 100 |

Foaming test 200 ml. of the deicing/defrosting composition of Example I were placed in a 1000 ml. glass cylinder containing an air inlet tube. Fastened to the bottom of the tube was a 1 in. diameter spherical gas diffuser stone of fused crystalline alumina grains. Air was passed through the inlet tube and the stone at a constant rate to form foam. The foam produced was passed through an outlet tube on to a surface to be deiced/defrosted. It was found that when the foam was directed on to an aluminum plate or a block of ice, the resultant foam coating was sufficiently stable for it not to drain away quickly. By comparison, liquid ethylene glycol was found to drain more quickly from such surfaces and thereby have a lesser deicing/defrosting action than the foamed composition of Example I.

EXAMPLE II

A foamable deicing/defrosting composition was made by blending together the following components in the proportions indicated.

| Components | Percent by weight of composition |
|---|---|
| Propylene glycol | 47.5 |
| Glycerol | 25.5 |
| Ethomeen S25 (namely a tertiary amine of the formula $R-N\begin{matrix}(CH_2CH_2O)_{7.5}-H\\(CH_2CH_2O)_{7.5}-H\end{matrix}$ in which R is a fatty alkyl group obtained from soybean amine) | 1 |
| Water | 25.0 |
| Octyl formol/ethylene oxide condensate having 7.5 oxyethylene units per octyl group | 1.0 |
| | 100.0 |

EXAMPLE III

A foamable deicing/defrosting composition was made by blending together the following components in the proportions indicated.

| Components | Percent by weight of composition |
|---|---|
| Glycerol | 50 |
| Ethomeen S25 (namely a tertiary amine of the formula $R-N\begin{matrix}(CH_2CH_2O)_{7.5}-H\\(CH_2CH_2O)_{7.5}-H\end{matrix}$ in which R is a fatty alkyl group obtained from soybean amine) | 4 |
| Water | 28 |
| | 100 |

*Foaming test*

The composition of Example III was foamable by a Sunbeam Spray lance.

We claim as our invention:

1. A process of deicing/defrosting a surface by foaming a composition consisting essentially of (a) a major proportion of alkylene polyol selected from ethylene glycol, propylene glycol, glycerol and mixtures thereof, (b) water, and (c) from about 0.5% by weight to 5% by weight based on total composition of a soluble tertiary amine wherein one group attached to the nitrogen is a $C_{12-18}$ aliphatic hydrocarbyl group and the other groups attached to the nitrogen atom are polyoxyalkylene groups wherein the oxyalkylene units are oxyethylene oxypropylene or mixtures thereof; and applying the resulting foam to said surface.

2. The process of claim 1 wherein the alkylene polyol is a mixture of propylene glycol and glycerol.

3. The process of claim 1 wherein the alkylene polyol is ethylene glycol.

4. The process of claim 1 wherein the composition additionally contains from 1% by weight to 10% by weight based on total composition of a $C_{1-3}$ monohydric aliphatic hydrocarbon alcohol.

5. The process of claim 4 wherein the monohydric alcohol is ethanol.

References Cited

UNITED STATES PATENTS

| | | | |
|---|---|---|---|
| 2,088,085 | 7/1937 | Gross et al. | 252—8.05 |
| 2,196,042 | 4/1940 | Timpson | 252—3 |

FOREIGN PATENTS 119,642   3/1945   Australia.

LEON D. ROSDOL, *Primary Examiner.*

J. D. WELSH, *Assistant Examiner.*